United States Patent
Hwang et al.

(10) Patent No.: US 8,833,203 B2
(45) Date of Patent: Sep. 16, 2014

(54) DAMPER FOR INPUT SHAFT OF TRANSMISSION

(71) Applicant: Hyundai Motor Company, Seoul (KR)

(72) Inventors: Jae Woong Hwang, Yongin-si (KR); Yong Wook Jin, Suwon-si (KR); Wan Soo Oh, Yongin-si (KR); Seok Young Shin, Hwaseong-si (KR); Dong Hoon Park, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/693,754

(22) Filed: Dec. 4, 2012

(65) Prior Publication Data

US 2014/0041478 A1    Feb. 13, 2014

(30) Foreign Application Priority Data

Aug. 9, 2012 (KR) .................. 10-2012-0087321

(51) Int. Cl.
*F16F 15/12* (2006.01)
*F16F 15/26* (2006.01)

(52) U.S. Cl.
CPC ................................... *F16F 15/26* (2013.01)
USPC ........................................ 74/574.3

(58) Field of Classification Search
USPC .................... 74/572.2, 573.12, 573.13, 574.3
See application file for complete search history.

(56) References Cited

U.S. PATENT DOCUMENTS

| 4,676,121 A | | 6/1987 | Kouno |
| 5,367,921 A | * | 11/1994 | Fukushima ................ 464/68.3 |
| 5,863,274 A | * | 1/1999 | Jackel .......................... 475/347 |
| 6,106,430 A | * | 8/2000 | Peinemann ................. 475/346 |
| 2010/0051411 A1 | * | 3/2010 | Saeki et al. ................. 192/30 V |

FOREIGN PATENT DOCUMENTS

| JP | H11-30282 A | 2/1999 |
| KR | 1020070039819 A | 4/2007 |
| KR | 1020090049295 A | 5/2009 |
| KR | 10-2009-0100331 A | 9/2009 |
| KR | 10-2012-0019705 A | 3/2012 |

\* cited by examiner

*Primary Examiner* — Vicky Johnson
(74) *Attorney, Agent, or Firm* — Morgan, Lewis & Bockius LLP

(57) ABSTRACT

A damper apparatus for an input shaft of a transmission, may include a flywheel having a reception space in which a inertial body may be provided so as to be rotatable relative to the flywheel, the input shaft extending into the reception space of the flywheel, and an inertial body assembly slidably coupled to the input shaft so as to provide rotational inertial force to the input shaft, the inertial body assembly being disposed in the reception space.

7 Claims, 3 Drawing Sheets

DAMPER FOR INPUT SHAFT OF TRANSMISSION

CROSS-REFERENCE TO RELATED APPLICATION

The present application claims priority to Korean Patent Application No. 10-2012-0087321, filed on Aug. 9, 2012, the entire contents of which is incorporated herein for all purposes by this reference.

BACKGROUND OF THE INVENTION

1. Field of the Invention

The present invention relates generally to a damper which is provided on an input shaft of a transmission to mitigate rattle noise of the transmission and, more particularly, to a technique which applies inertial force to the input shaft of the transmission and stops resonance from occurring in a specific frequency band, thus mitigating rattle noise of the transmission.

2. Description of Related Art

Conventionally, an inertial plate is provided on an input shaft of a transmission so that resonance of a specific frequency band which causes a problem of rattle noise of the transmission can be effectively avoided even when a DMF (Dual Mass Flywheel) or the like is not used.

However, in the conventional structure in which the inertial plate is installed on the input shaft, space for installation of the inertial plate on the input shaft is required so that the size of a transmission housing must be increased. This technique is therefore not easily applied to the existing transmission housing or requires an increase in the length of the transmission, thus complicating the installation of the transmission in a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a damper for an input shaft of a transmission which is configured such that inertial force is applied to the input shaft of the transmission, thus stopping resonance from occurring in a specific frequency band, thereby mitigating rattle noise of the transmission, and which can solve the difficulty of providing space for the installation of an element that pertains to the application of inertial force, so that an existing transmission housing can continue being used as is, and the length of the transmission can be prevented from increasing, thus ensuring ease of installation of the transmission in a vehicle.

In an aspect of the present invention, a damper apparatus for an input shaft of a transmission, may include a flywheel having a reception space in which a inertial body is provided so as to be rotatable relative to the flywheel, the input shaft extending into the reception space of the flywheel, and an inertial body assembly slidably coupled to the input shaft so as to provide rotational inertial force to the input shaft, the inertial body assembly being disposed in the reception space.

The inertial body assembly may include a drive plate splined to the input shaft, the inertial body provided around the drive plate and being rotatable relative to the drive plate, and an elastic member connecting the drive plate to the inertial body to elastically support rotation of the inertial body relative to the drive plate.

The elastic member is a torsion spring.

The inertial body assembly may further include friction plates generating friction therebetween to form hysteresis when the drive plate and the inertial body rotate relative to each other, and a spring provided to elastically bias the friction plates and continuously form frictional pressure between the friction plates.

In the inertial body assembly, at least one slot is formed in the drive plate, the slot extending in a predetermined length in a circumferential direction of the drive plate, and a stopper pin is provided in the inertial body and engaged to the at least one slot of the drive plate, wherein the stopper pin rotates along the at least one slot around a center of the drive plate and limits, within the at least one slot, displacement of the inertial body relative to the drive plate.

The flywheel may include a first flywheel and a second flywheel formed in such a way that the flywheel is divided into an engine side body and a transmission side body based on the reception space, the first flywheel and the second flywheel are integrally coupled to each other by a fastening element after the inertial body assembly is disposed in the reception space.

The input shaft is supported on the flywheel by a bearing, and the inertial body assembly is splined to a circumferential outer surface of the input shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
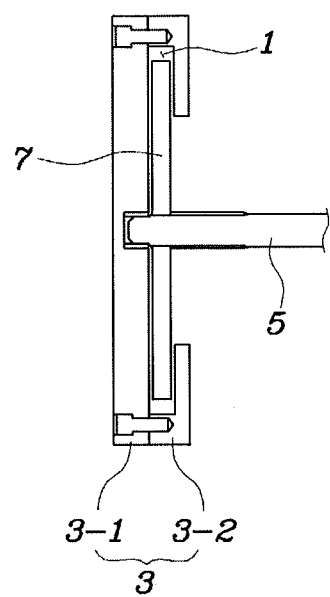
FIG. 1 is a schematic view illustrating the construction of a damper for an input shaft of a transmission, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s)

to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a damper for an input shaft of a transmission according to an exemplary embodiment of the present invention will be described in detail with reference to the attached drawings.

Referring to FIGS. 1 through 4, the damper according to an exemplary embodiment of the present invention includes a flywheel 3, an input shaft 5 of the transmission and an inertial body assembly 7. The flywheel 3 has a reception space 1 in which a rotary body is provided so as to be rotatable relative to the flywheel 3. The input shaft 5 extends into the reception space 1 of the flywheel 3. The inertial body assembly 7 is coupled to the input shaft 5 so as to provide rotational inertial force and is disposed in the reception space 1.

Figure 2:
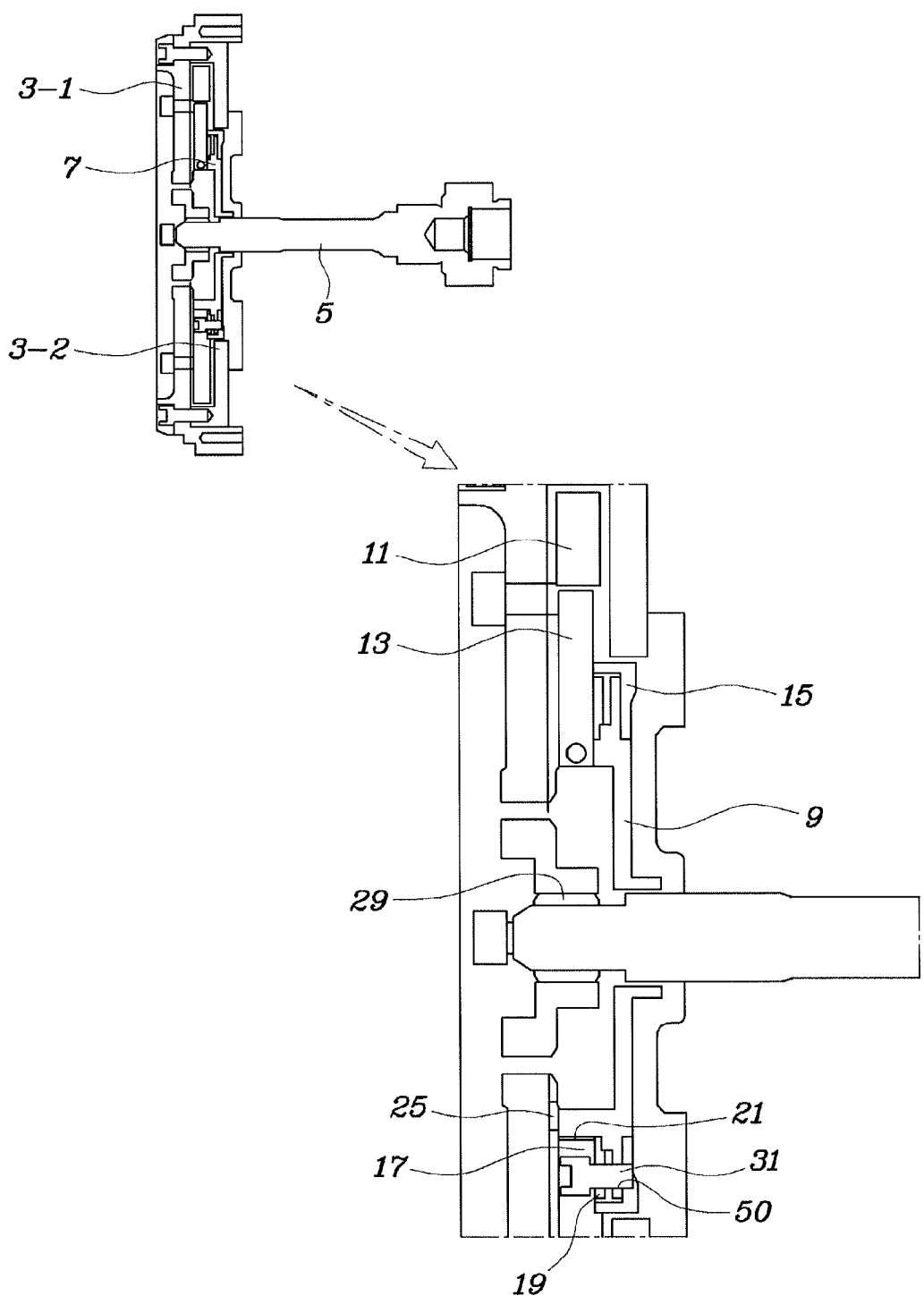
FIG. 2 is a view showing an exemplary embodiment of the input shaft damper according to an exemplary embodiment of the present invention.
Figure 3:
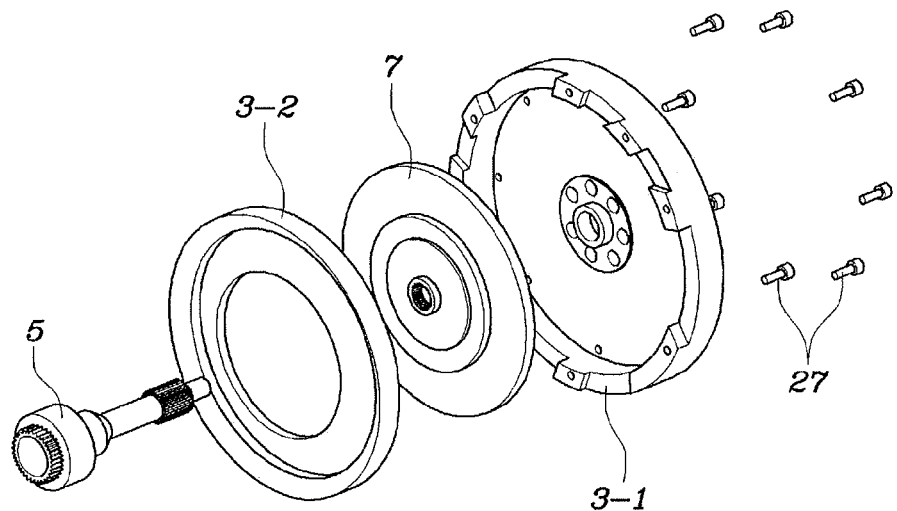
FIG. 3 is an exploded perspective view illustrating a flywheel and an inertial body assembly of FIG. 2.

A conceptual description of an exemplary embodiment illustrated in FIGS. 2 through 4 will now be made. In the exemplary embodiment of the present invention, as shown in FIG. 1, the flywheel 3 which has been configured to form a single body in the conventional technique is divided into a first flywheel 3-1 and a second flywheel 3-2. The space is defined between the first and second flywheels 3-1 and 3-2 so that the inertial body assembly 7 is installed in the space. Thus, space for installation of the inertial body assembly 7 is not required in the transmission. Therefore, not only can the existing transmission housing be used but the installation of the inertial body assembly 7 does not also require an increase in the length of a transmission that is being newly produced. As a result, the present invention can ensure ease of installation of the transmission in a vehicle.

In this embodiment, the inertial body assembly 7 includes a drive plate 9, an inertial body 11 and a torsion spring 13. The drive plate 9 is splined to the input shaft 5. The inertial body 11 is disposed around the drive plate 9 so as to be rotatable relative to the drive plate 9. The torsion spring 13 connects the drive plate 9 to the inertial body 11 to elastically support rotation of the inertial body 11 relative to the drive plate 9.

Therefore, when rotational vibration of an engine is transmitted to the input shaft 5 so that the input shaft 5 and the drive plate 9 rotationally vibrate, the inertial body 11 connected to the torsion spring 13 is elastically relative-rotated by the torsion spring 13, thus providing rotational inertial force to the input shaft 5 via the drive plate 9, thereby stopping the resonance of a frequency band that causes rattle noise. As a result, generation of rattle noise can be mitigated.

The inertial body assembly 7 includes friction plates 15 which generate friction therebetween to form hysteresis when the drive plate 9 and the inertial body 11 rotate relative to each other, and springs 17 which are provided to continuously form frictional pressure of the friction plates 15.

That is, relative rotation between the drive plate 9 and the inertial body 11 causes friction between the friction plate 15. The friction between them forms hysteresis, thus damping vibrational energy transmitted from the input shaft 5 and the drive plate 9.

Figure 4:
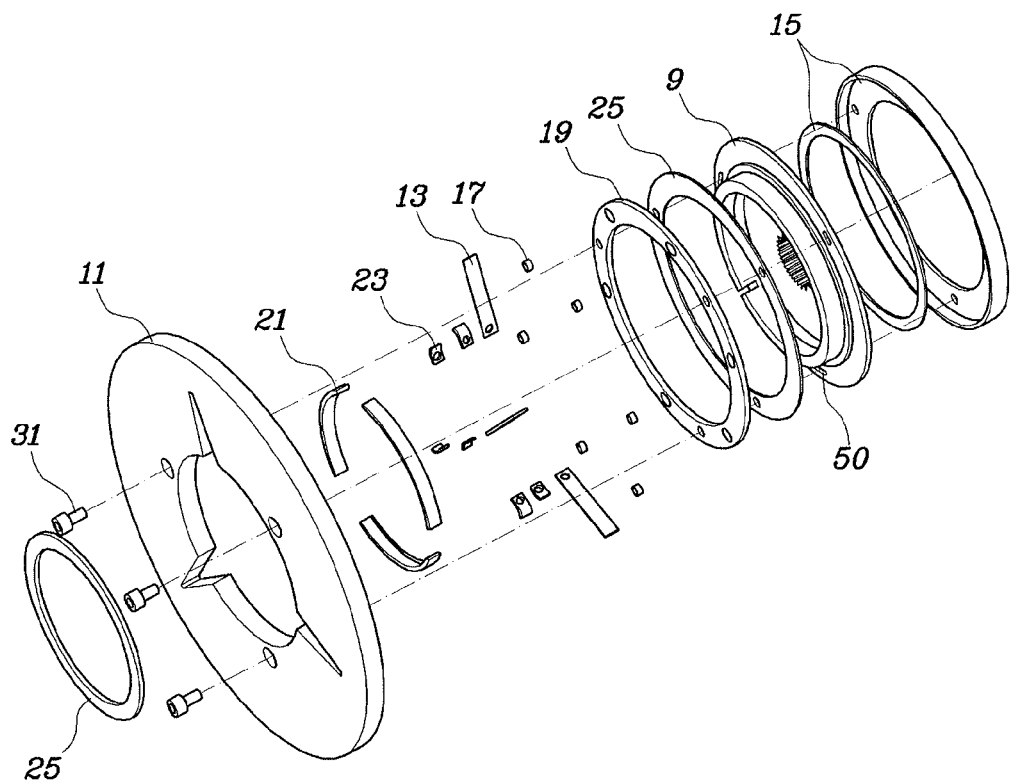
FIG. 4 is an exploded perspective view of the inertial body assembly of FIG. 3.

For reference, as shown in FIG. 4, the present invention further includes a spring holder 19. In this embodiment, the spring holder 19 has a shape of a ring which has a plurality of holes in which the coil spring type springs 17 are respectively disposed. The spring holder 19 functions to maintain correct positions of the springs 17 so that they can continuously and evenly apply pressure to the friction plates 15.

Furthermore, referring to FIG. 4, the inertial body 11 is smoothly rotatably supported on the drive plate 9 by a plate bearing 21. FIG. 4 additionally illustrates a washer 23, a trust washer 25, etc. along with other elements.

In the inertial body assembly 7, at least one slot 50 is formed in the drive plate 9 and extends a predetermined length in a circumferential direction. A stopper pin 31 is provided in the inertial body 11, wherein the stopper pin 31 rotates along the slot 50 around the center of the drive plate 9 that serves as an axis of rotation, and limits along with the slot displacement of the inertial body 11 relative to the drive plate 9. As such, the inertial body assembly 7 is configured such that the relative rotation between the drive plate 9 and the inertial body assembly 7 is limited to within an appropriate range.

The flywheel 3 includes the first flywheel 3-1 and the second flywheel 3-2 which are formed in such a way that the flywheel 3 is divided into an engine side body and a transmission side body based on the reception space 1. The first flywheel 3-1 and the second flywheel 3-1 are integrally coupled to each other by fastening elements 27 after the inertial body assembly 7 is disposed in the reception space 1, so that the inertial body assembly 7 can be kept in the reception space 1.

The input shaft 5 is supported on the flywheel 3 by a bearing 29. The inertial body assembly 7 is splined to a circumferential outer surface of the input shaft 5.

That is, because the input shaft 5 is supported on the flywheel 3 by the bearing 29, power is substantially transmitted from the flywheel 3 to the input shaft 5 by a clutch in the same manner as that of the conventional technique without direct transmission of power between it and the flywheel 3. To merely ensure structural stability, the input shaft 5 is configured such that it is rotatably supported on the flywheel 3 by the bearing 29 while the inertial body assembly 7 is installed on the input shaft 5.

In the damper for the input shaft 5 of the transmission according to an exemplary embodiment of the present invention having the above-mentioned construction, a separate space for installation of the inertial body assembly 7 is not required to be formed in the transmission. Therefore, not only can the existing transmission housing continue to be used but a transmission that is being newly produced can have a compact structure of a comparatively short length, thus ensuring the ease of installation of the transmission in a vehicle. Further, rotational inertial force provided from the inertial body assembly 7 installed in the flywheel 3 can markedly mitigate rattle noise that is caused by rotational vibration of the input shaft 5.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A damper apparatus for an input shaft of a transmission, comprising:
   a flywheel having a reception space in which an inertial body is provided so as to be rotatable relative to the flywheel;
   the input shaft extending into the reception space of the flywheel with the input shaft being rotatable relative to the flywheel; and
   an inertial body assembly including the inertial body;
   wherein friction plates of the inertial body assembly are operably coupled to the input shaft, and the friction plates directly frictionally engage each other to allow hysteresis when the drive plate and the inertial body rotate relative to each other;
   wherein the inertial body of the inertial body assembly is elastically coupled to the input shaft so as to provide rotational inertial force to the input shaft; and
   wherein the inertial body of the inertial body assembly is disposed in the reception space spaced from the flywheel.

2. The damper apparatus as set forth in claim 1, wherein the inertial body assembly includes:
   a drive plate splined to the input shaft, wherein one of the friction plates abuts against the drive plate;
   the inertial body provided around the drive plate and being rotatable relative to the drive plate; and
   an elastic member connecting the drive plate to the inertial body to elastically support rotation of the inertial body relative to the drive plate.

3. The damper apparatus as set forth in claim 2, wherein the elastic member is a torsion spring.

4. The damper apparatus as set forth in claim 2, wherein the inertial body assembly further includes a spring provided to elastically bias the friction plates and continuously form frictional pressure between the friction plates.

5. The damper apparatus as set forth in claim 2, wherein in the inertial body assembly,
   at least one slot is formed in the drive plate, the at least one slot extending in a predetermined length in a circumferential direction of the drive plate, and
   a stopper pin is provided in the inertial body and engaged to the at least one slot of the drive plate, wherein the stopper pin rotates along the at least one slot around a center of the drive plate and limits, within the at least one slot, displacement of the inertial body relative to the drive plate.

6. The damper apparatus as set forth in claim 1, wherein the flywheel includes
   a first flywheel and a second flywheel formed in such a way that the flywheel is divided into an engine side body and a transmission side body based on the reception space,
   the first flywheel and the second flywheel are integrally coupled to each other by a fastening element after the inertial body assembly is disposed in the reception space.

7. The damper apparatus as set forth in claim 1, wherein the input shaft is supported on the flywheel by a bearing, and
   the inertial body assembly is splined to a circumferential outer surface of the input shaft.

* * * * *